(12) United States Patent
Bjorklund et al.

(10) Patent No.: US 8,469,091 B2
(45) Date of Patent: Jun. 25, 2013

(54) METHOD FOR PRODUCTION OF HIGH PURITY DISTILLATE FROM PRODUCED WATER FOR GENERATION OF HIGH PRESSURE STEAM

(75) Inventors: Daniel P. Bjorklund, Waukesha, WI (US); Gregory J. Mandigo, Crivitz, WI (US); Richard M. Schoen, Hartland, WI (US); James Michael Marlett, Menomonee Falls, WI (US); Chandrakant Tiwari, Oconomowoc, WI (US)

(73) Assignee: Aquatech International Corporation, Canonsburg, PA (US)

( * ) Notice: Subject to any disclaimer, the term of this patent is extended or adjusted under 35 U.S.C. 154(b) by 324 days.

(21) Appl. No.: 12/851,165

(22) Filed: Aug. 5, 2010

(65) Prior Publication Data

US 2011/0061867 A1    Mar. 17, 2011

Related U.S. Application Data

(60) Provisional application No. 61/232,067, filed on Aug. 7, 2009.

(51) Int. Cl.
*B01D 3/00* (2006.01)
*E21B 43/24* (2006.01)
*E21B 43/34* (2006.01)

(52) U.S. Cl.
USPC ........ 166/266; 166/267; 166/272.3; 166/303; 203/12; 203/36; 203/39; 203/40

(58) Field of Classification Search
None
See application file for complete search history.

(56) References Cited

U.S. PATENT DOCUMENTS

| | | | |
|---|---|---|---|
| 3,930,960 A * | 1/1976 | Taylor | 202/185.6 |
| 4,601,731 A * | 7/1986 | Michelson | 95/272 |
| 4,695,664 A | 9/1987 | Whittle | |
| 6,755,251 B2 | 6/2004 | Thomas et al. | |
| 7,591,311 B2 * | 9/2009 | Minnich et al. | 166/272.3 |
| 2005/0279500 A1 | 12/2005 | Heins | |
| 2008/0110630 A1 | 5/2008 | Minnich et al. | |
| 2008/0190607 A1 | 8/2008 | Minnich et al. | |
| 2008/0196894 A1 | 8/2008 | Minnich et al. | |
| 2009/0056945 A1 | 3/2009 | Minnich et al. | |
| 2010/0282644 A1 * | 11/2010 | O'Connor et al. | 208/427 |
| 2012/0145386 A1 * | 6/2012 | Bjorklund et al. | 166/266 |
| 2012/0193213 A1 * | 8/2012 | James | 203/10 |

OTHER PUBLICATIONS

International Search Report and the Written Opinion of the International Searching Authority for PCT/US2010/044558 (Forms PCT/ISA/220, PCT/ISA/210, and PCT/ISA/237).

\* cited by examiner

*Primary Examiner* — George Suchfield
(74) *Attorney, Agent, or Firm* — Buchanan Ingersoll & Rooney PC (57) ABSTRACT

Embodiments presented herein provide an evaporation based zero liquid discharge method for generation of up to 100% quality high pressure steam from produced water in the heavy oil production industry. De-oiled water is processed in an evaporation system producing a distillate that allows steam to be generated with either drum-type boilers operating at higher pressures or once-through steam generators (OTSGs) operating at higher vaporization rates. Evaporator blowdown is treated in a forced-circulation evaporator to provide a zero liquid discharge system that could recycle >98% of the deoiled water for industrial use. Exemplary embodiments of the invention provide at least one "straight sump" evaporator and at least one hybrid external mist eliminator. Embodiments of the evaporation method operate at a higher overall efficiency than those of the prior art by producing distillate at a higher enthalpy which minimizes the high pressure boiler preheating requirement.

20 Claims, 10 Drawing Sheets

(Inner Core) (Outer Annulus)

METHOD FOR PRODUCTION OF HIGH PURITY DISTILLATE FROM PRODUCED WATER FOR GENERATION OF HIGH PRESSURE STEAM

CROSS-REFERENCE TO RELATED APPLICATIONS

This application claims priority to U.S. provisional patent application No. 61/232,067, filed on Aug. 7, 2009, and incorporated by reference herein.

BACKGROUND OF THE INVENTION

1. Field of the Invention

Embodiments of the invention relate to methods and apparatuses for generation of high-quality high pressure steam from produced water in the heavy oil production industry.

2. Description of the Related Art

Heavy oil recovery processes employ the "steamflood" technique, in which steam is injected to the oil bearing formations to improve the recovery of heavy oils. Typically, several units of steam are required for recovering each unit of oil. Heavy oil is a viscous fluid, and the heat from steam reduces the viscosity of the oil allowing it to flow to a production well. In the process of heating the oil, steam condenses. This condensed steam is called produced water. The mixture of oil and produced water is pumped to the surface through the production well. The mixture of oil and produced water is separated in individual fractions in the conventional deoiling processes typical in oil recovery operations.

Due to the large amount of steam that is normally required for heavy oil recovery, it is desirable to recycle the produced water for reuse. This requires treatment of the produced water to make it suitable as feedwater to a steam generator or boiler. Typically a single evaporator and mechanical vapor compressor are used to treat produced water for production of distillate as boiler feedwater.

Unfortunately, the current approaches to produced water purification and distillate production have drawbacks and disadvantages that hinder achievement of desired distillate purity in a cost-effective manner. The current practice of disposing of wastewater by injecting in a deep well formation in heavy oil facilities is also not a very environmentally prudent approach. Therefore, there is a need for a more cost-effective system for treating produced water that can produce a relatively pure feedwater stream for a steam generation system and can offer an environmentally friendly approach to waste disposal at the heavy oil facilities.

Evaporation technology has been applied to the heavy oil sands process to generate distillate that is suitable for steam generation. For example, steam is used in the enhanced oil recovery plants through a steam injection process that liquefies heavy oil and transport the heavy oil to the surface where it can be separated from water and further refined. The produced water that is separated from the oil is processed by the evaporator. This processes the water into distillate suitable for steam generation. The steam generators can be either once through steam generators (OTSGs) or high pressure drum-type boilers.

Conventional Mechanical Vapor Compression (MVC) evaporation technology uses vertical falling film evaporators to vaporize produced water. The droplets that are entrained in this water vapor tend to remain entrained and mix with the condensed vapor to contaminate the distillate quality. Typically these droplets are removed with a demister located in the annular area of the evaporator sump. The internal demister offers only one stage of droplet elimination; therefore, the process is limited in the distillate purity that may be achieved. This underachievement limits the use of this distillate. Drum boilers must be designed and operated at lower pressures because of this deficiency. OTSGs are also limited in the vaporization rate they can achieve.

Further problems ensue for the conventional purification technology because of the quiescent volume in the evaporator sump. A conventional evaporator has a diameter significantly larger than the heat exchanger tube bundle. As a result, when the falling film falls into the sump it primarily moves directly downward with relatively little agitation of the annular volume of the cylindrical sump. The lack of mixing in this region allows components such as oil and grease to accumulate in this quiescent volume. There are several drawbacks inherent in this design including a) the accumulation of oil and grease in the evaporator system during normal operation, b) the need for an additional oil removal step dedicated to the accumulated oil in the wide-sump evaporator, c) higher concentrations of oil and grease in the evaporator cause greater concentrations of oil and grease in the purified distillate which pollutes the primary product.

Another significant drawback of the conventional treatment approach is that the evaporator system operates at a thermal efficiency less than ideal. This requires excess energy to be removed from the system. The conventional approach achieves energy balance by venting steam from the evaporator system. Since this vent steam typically contains concentrations of hydrogen sulfide and other environmentally harmful substances, the vent steam is a waste stream that is not suitable for vent to the atmosphere. Instead it must be collected and disposed in a flare, catalytic oxidizer or other disposal system. This limitation represents a significant drawback because it increases the capital cost and operating costs of the disposal system.

BRIEF SUMMARY OF THE INVENTION

Embodiments provided herein may overcome the limitations caused by dissolved solids in the distillate produced by the conventional MVC evaporation system. A high purity distillate is produced that can allow higher operating pressures for drum boilers or higher vaporization rates for OTSGs. The need for downbore disposal of wastewater is also reduced or eliminated.

This new evaporation method also continuously produces this distillate at an overall efficiency that is greater than that which is achievable with the conventional technology. Embodiments of the invented process contain a control method that increases the enthalpy of the distillate leaving the evaporator system which enters the boiler system. This higher enthalpy reduces the boiler preheating duty, increasing boiler efficiency because the amount of fuel gas required to bring the boiler feedwater to boiling temperature is decreased by as much as 5-10% depending on the operating pressure of the boiler. This is achieved without the need to mix boiler blowdown with the evaporator feedwater (which would increase the energy available to transfer to the distillate). The higher enthalpy is achieved with an automated preheater bypass that simultaneously increases the distillate enthalpy and reduces the flow rate of the toxic vent steam exiting the evaporator process.

Embodiments of the invention may include some or all of these design features:
  Mist elimination performed external to the falling-film evaporator vessel;

Mist elimination performed with multiple stages: two or more;

Mist elimination performed using agglomeration technology;

Water vapor scrubbed with a cleaning solution to remove undesirable volatile compounds;

Mist eliminators washed to prevent solids accumulation;

Straight sump vertical falling-film evaporators;

Evaporator feedwater reacted with sodium hydroxide to precipitate hardness upstream of the evaporator vessels;

Evaporators operated at a high pH. Typically the pH is between 9.5 and 13.0, as measured at 25° C., to reduce corrosion potential and permit use of leaner metallurgy;

Preheater partial bypass to increase overall plant efficiency by maximizing distillate enthalpy to the boiler system;

Preheater partial bypass to decrease the generation of a toxic vent steam typically containing hydrogen sulfide and other environmentally harmful compounds;

Dual-distribution trays to distribute brine evenly around the perimeter of the tube wall of the vertical tubes; and Zero liquid discharge achieved using forced-circulation evaporation, drying technologies, rotary separation and/or filtration.

Embodiments may provide, for example, a method for production of purified distillate from produced water used in heavy oil production, including providing produced water stream extracted from a heavy oil production well; deoiling the produced water stream to provide a deoiled water stream; increasing the pH of the deoiled water stream to provide a softened water stream by precipitating calcium and magnesium from the deoiled water stream; preheating the softened water stream in a heat exchanger; deaerating the softened water stream; reconcentrating the softened water stream in a first evaporation stage in an evaporator vessel including a recirculating brine by generating a water vapor stream and a concentrated brine stream; demisting the water vapor stream in a mist eliminator external to the evaporator vessel to reduce solids content prior to condensation thereby creating the high purity distillate stream, where the demisting step includes the stages of treating a brine-containing water vapor in at least one coarse removal chevron, treating the brine-containing water vapor with at least one mesh agglomerator pad, and treating the brine-containing water vapor in at least one polishing chevron; and sending the high purity distillate to a high pressure boiler or steam generator for the production of steam and subsequent injection to a reservoir via an injection well.

In a further embodiment the produced water stream is supplemented by addition of at least one member of the group consisting of boiler blowdown water, makeup water, and wastewater to the produced water stream. In a further embodiment the first evaporation stage is a vertical falling-film evaporator. The vertical falling-film evaporator may be a straight-sump vertical falling-film evaporator. In at least one embodiment the concentration of oil in the deoiled water stream is less than about one hundred parts per million. The first evaporation stage may also be a multiple-effect evaporator or a horizontal spray-film evaporator.

In another embodiment, the recirculating brine recirculating at the top of the vertical falling-film evaporator is cascaded through a plurality of horizontal distribution trays prior to being distributed on the upper tubesheet and subsequently evenly distributed in the evaporator tubes. A further embodiment includes treating the concentrated brine stream in a second evaporation stage, wherein said second evaporation stage is a forced-circulation evaporator.

When pH is increased, it may, for example, be increased to between 9.5 and 13.0 as measured at 25° C. pH may be increased by addition of sodium hydroxide.

A further embodiment provides a method for producing boiler water from produced water used in heavy oil production, including producing purified distillate as described above, including the step of managing the enthalpy of the purified distillate using a preheater bypass, producing boiler water for the boiler from the purified distillate, wherein said enthalpy management maximizes enthalpy of water delivered to the boiler.

The method may also include deaerating the purified distillate. The deaeration produces a steam vent with a low flow rate because the excess enthalpy is released from the system in the distillate stream in lieu of being released as additional steam vent, thereby reducing the operating requirements of at least one of the catalytic oxidizer and flare stack.

A further embodiment may include further concentrating said softened water stream in a second evaporation stage which produces another purified distillate stream and produces a dry solids product to achieve zero-liquid discharge.

An additional embodiment includes further concentrating a brine blowdown from the first evaporation stage, producing another purified distillate stream and a reduced volume of concentrated brine wastewater for disposal. An additional embodiment includes further concentrating a brine blowdown from the first evaporation stage, thereby producing another purified distillate stream and a reduced volume of concentrated brine wastewater to minimize the size of a downstream zero liquid discharge crystallizer.

In a further embodiment, a preheating step is conducted upstream of said softening step. In a still further embodiment a produced water stream is supplemented with makeup water, and prior to supplementing the produced water, the makeup water is softened with one of, for example, a membrane system and an ion exchange system.

In another embodiment the produced water stream is supplemented with makeup water. This may include heating the makeup water independently of the other evaporator feedwater streams prior to entry of the makeup water into the evaporator.

In a further embodiment the produced water stream is supplemented with makeup water, and, furthermore, prior to addition of the makeup water to the produced water stream, the pH of the makeup water is lowered by adding acid to the makeup water. This produces free carbon dioxide for removal from said makeup water.

DETAILED DESCRIPTION OF THE FIGURES

DETAILED DESCRIPTION OF THE INVENTION

Figure 1:
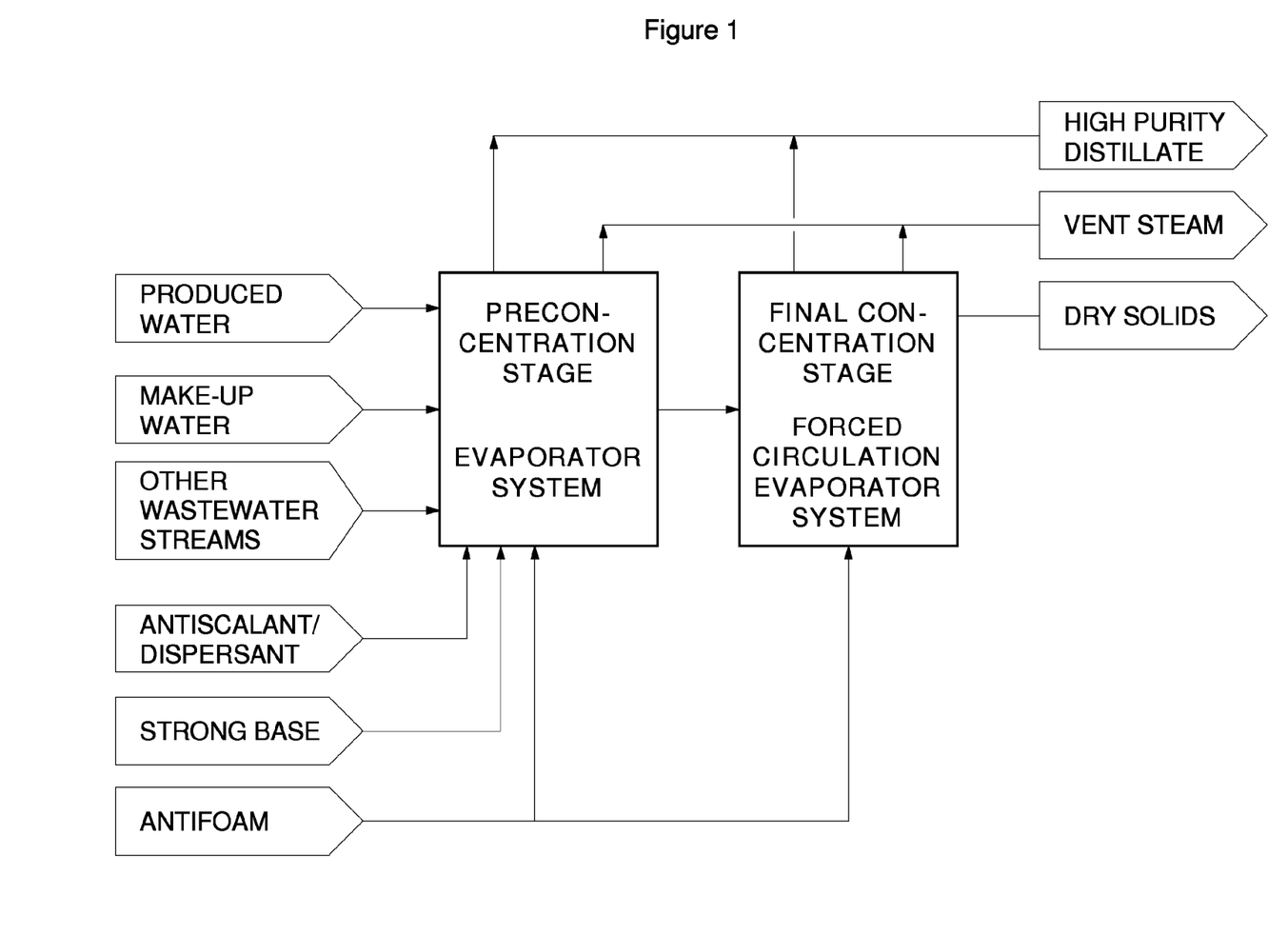
FIG. 1 provides a flow diagram showing the evaporation system that generates high pressure steam while achieving zero liquid discharge.
Figure 7:
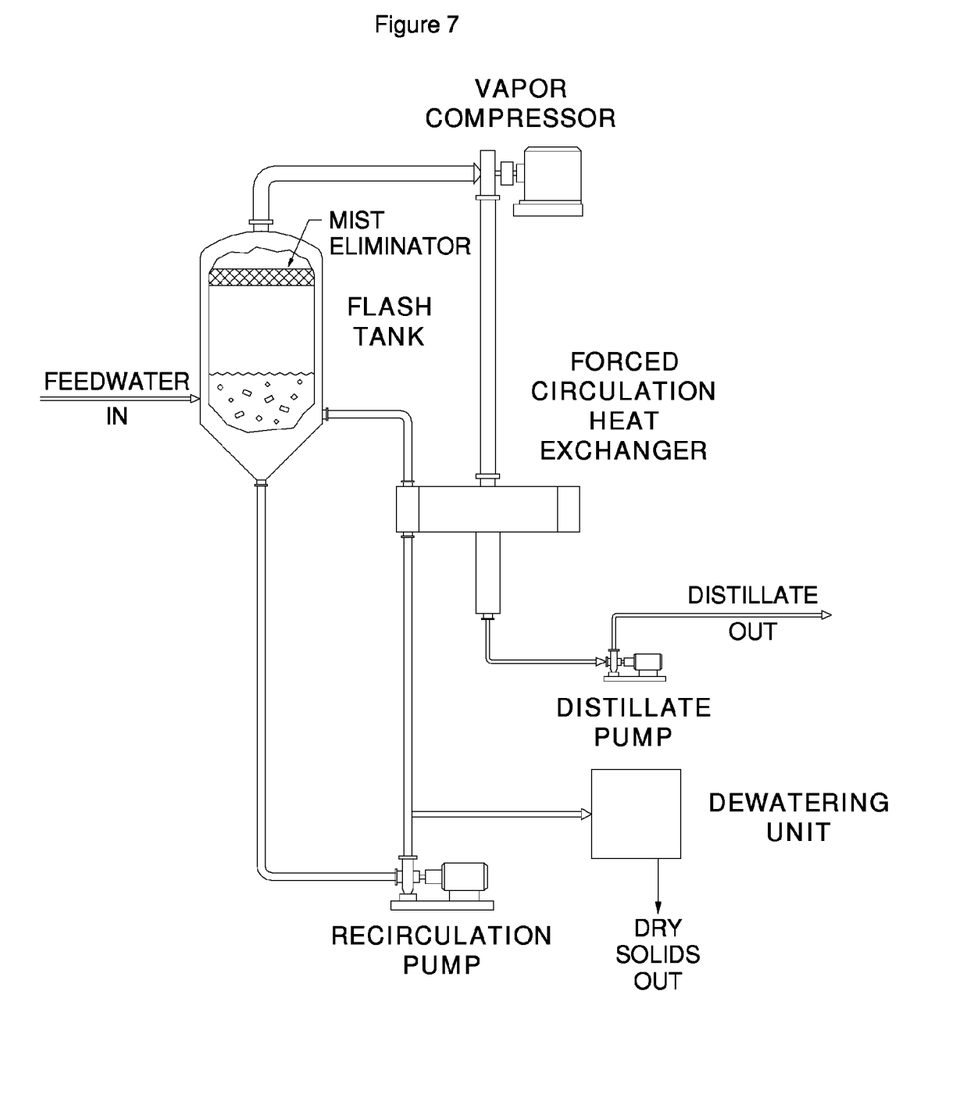
FIG. 7 shows a forced-circulation evaporator system.

Produced water is water that has been extracted from oil well production fluid. In embodiments of the invention this fluid is delivered in a deoiled state to the evaporator system which treats the produced water by generating a high purity distillate suitable for recycling as boiler feedwater. The produced water is fed to the evaporator system with or without make-up water (either fresh or brackish), boiler blowdown and other waste water streams. A block-flow diagram (FIG. 1) shows these streams entering the evaporator system and being processed by a vertical falling-film evaporator system and/or a forced-circulation evaporator system to achieve zero liquid discharge (ZLD). A forced-circulation evaporator system is further shown in FIG. 7. Antifoam, antiscalant, dispersant, and strong bases can be added to the system. The system recycles greater than 98% of the feed water as high purity distillate. Dry solids, passing the Environmental Protection Agency (EPA) paint filter test ("Test Methods for Evaluating Solids Waste, Physical/Chemical Methods": United States Government Publication SW846: Method 9095B) are discharged from the system along with vent steam.

The feed streams are combined in a reaction tank where sodium hydroxide (a strong base) is added to react with the hardness in the feedwater to soften the feedwater. Reaction chamber pH is maintained near 10.5 at 25° C. The added benefit to high pH softening of the feedwater is that the brine concentrates within the evaporator system at an elevated pH (typically above pH of 10.5). It is well established within the material science community that a deaerated, high chloride environment that exists at high pH eliminates corrosion potential and allows for the use of leaner metallurgies for the construction of the evaporator system. These leaner metallurgies would typically include the grades 316L SS, 2304 Duplex and 2205 Duplex. (316 SS is a common industrial austenitic stainless steel grade. Duplex stainless steels are steels that are made with a combination of austenitic and ferritic phases. The combined phases cause duplex steels to have superior strength and corrosion resistance properties compared to simple austenitic grades.) This precludes the need to use higher metallurgies which reduces the capital cost of the system.

The feed water is preheated in a heat exchanger (plate and frame-type, shell and tube-type, spiral-type, etc.) and deaerated to remove oxygen and volatile compounds such as light organic hydrocarbons. Steam that vents from the shell-side of the evaporator(s) is used as the stripping steam in the deaerator. The steam is vented from the deaerator, collected in a header with other steam vent sources and processed in a catalytic oxidizer, flare stack, or other disposal system to prevent harmful compounds such as hydrogen sulfide and mercaptains from escaping to the environment.

An automatically controlled preheater bypass may continuously maximize the enthalpy of the distillate flowing to the boiler system. This system may also minimize the vent steam rate. This control action minimizes the capital and operating cost of the vent disposal system.

The deaerated and preheated feed stream is delivered to the evaporator system where vertical-tube falling-film evaporator preconcentrates the produced water and minimizes the wastewater volume fed to the forced-circulation evaporator. The VTFF evaporator works by circulating brine water at a high flow rate to the evaporator top-head where the brine is distributed evenly on the inside perimeter of the vertical tubes. As the brine flows down the inside of the tube, steam condenses on the outside of the tube and transfers heat to the falling brine film. This brine water is vaporized inside the tube and flows out of the evaporator as water vapor.

Figure 2:
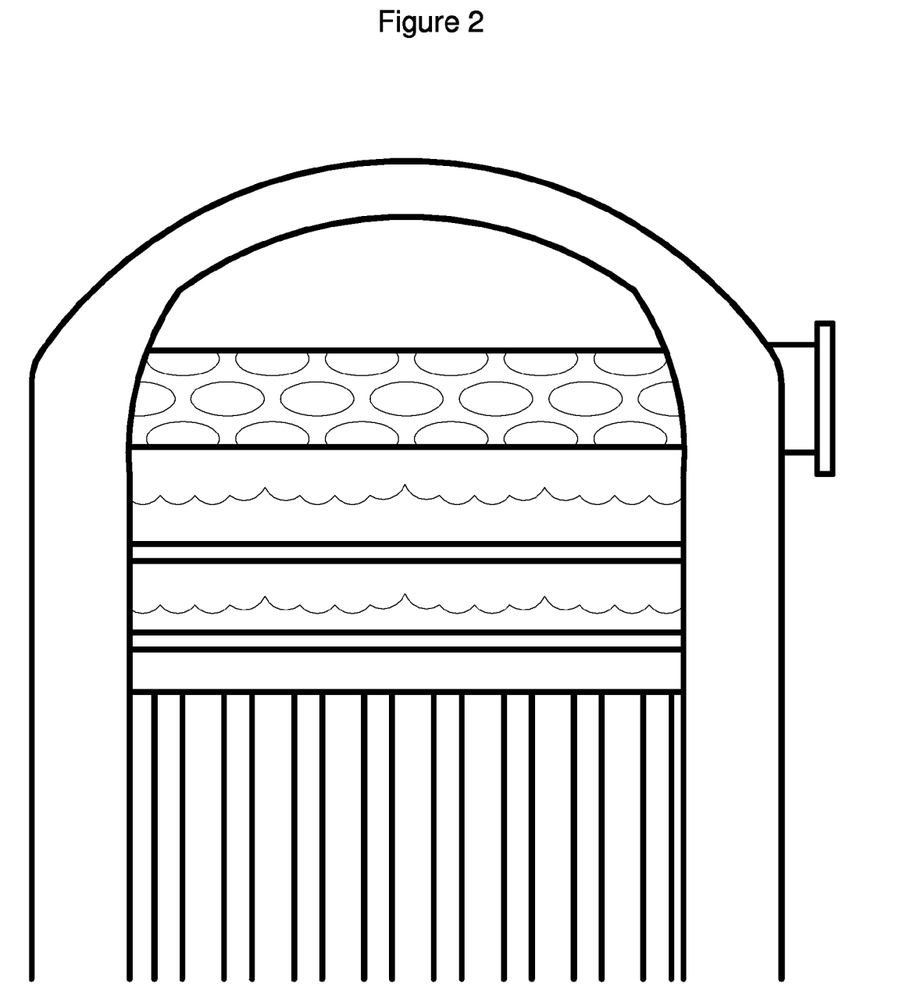
FIG. 2 is an evaporator top-head showing the dual-distribution trays and strainer.

The brine distribution in the top-head of the evaporator may be achieved using a dual distributor tray technology (FIG. 2). The brine is evenly cascaded through two horizontal trays. Flow is directed onto the upper tube-sheet where it flows evenly to the inside perimeter of the tube wall. This design precludes the use of spiral tube distributors, which are conventionally inserted into the tubes causing plugging problems. These distribution trays use relatively wide holes to allow any suspended solids to pass through without plugging. Additionally, a strainer can be utilized upstream of the distribution trays to capture larger solids; this offers additional protection against plugging.

Figure 3:
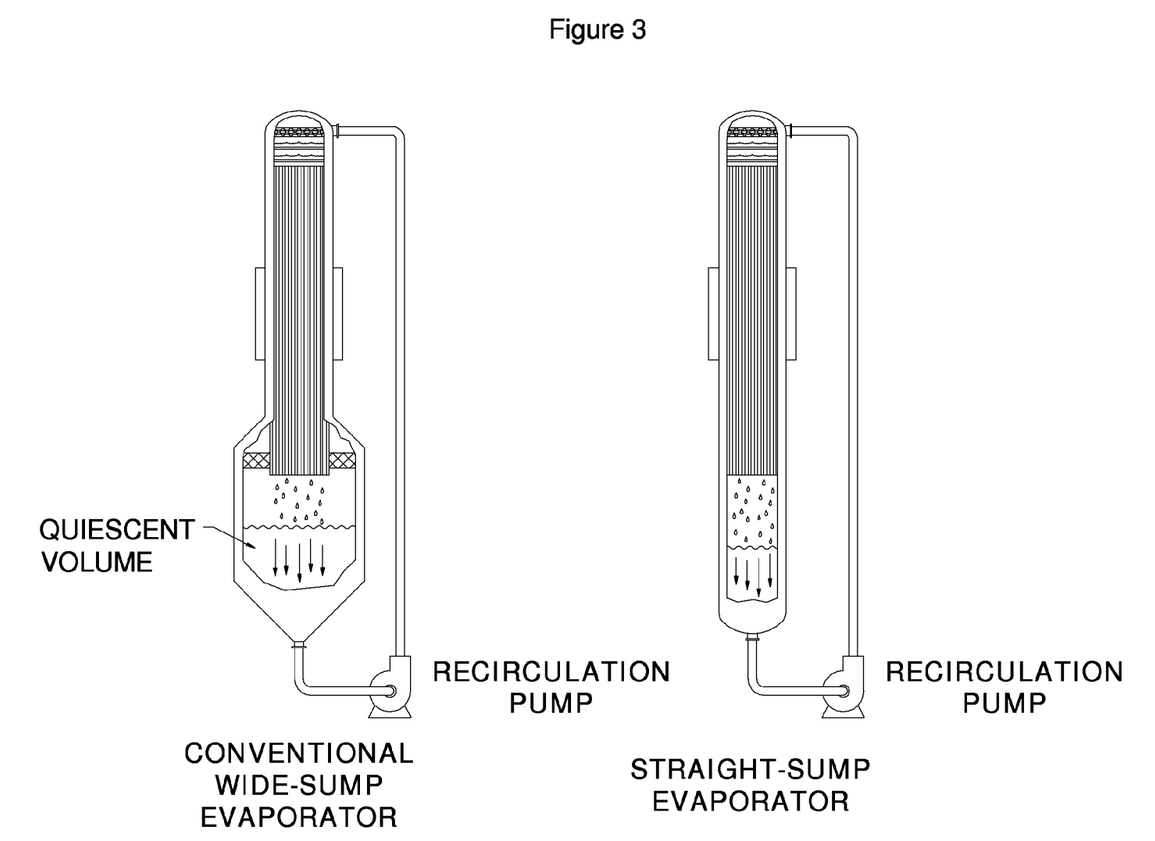
FIG. 3 is a comparison of the conventional wide-sump evaporator with a straight sump evaporator found in embodiments of the invention.
Figure 4:
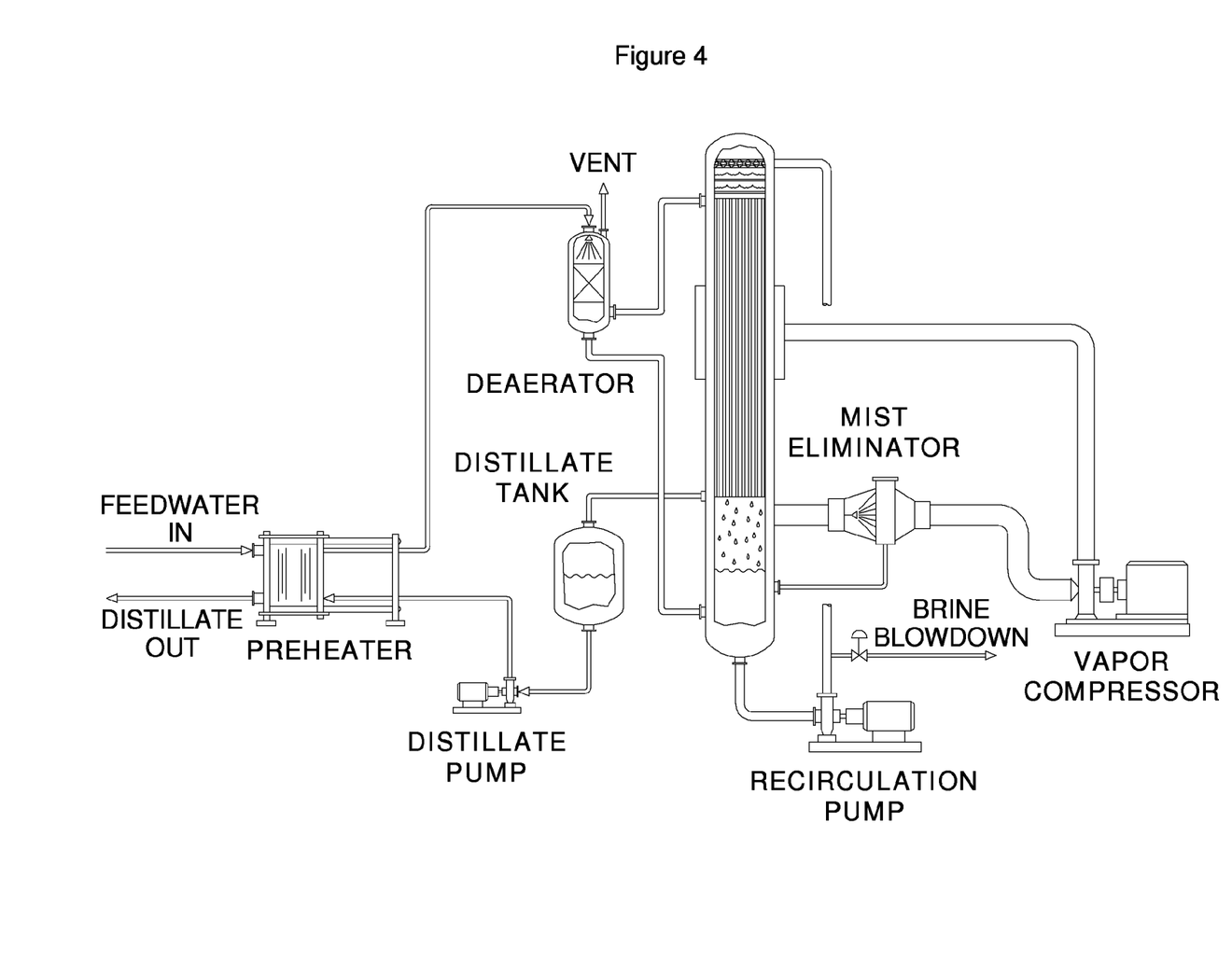
FIG. 4 is a straight sump, vertical tube falling film evaporator and external mist eliminator.
Figure 5:
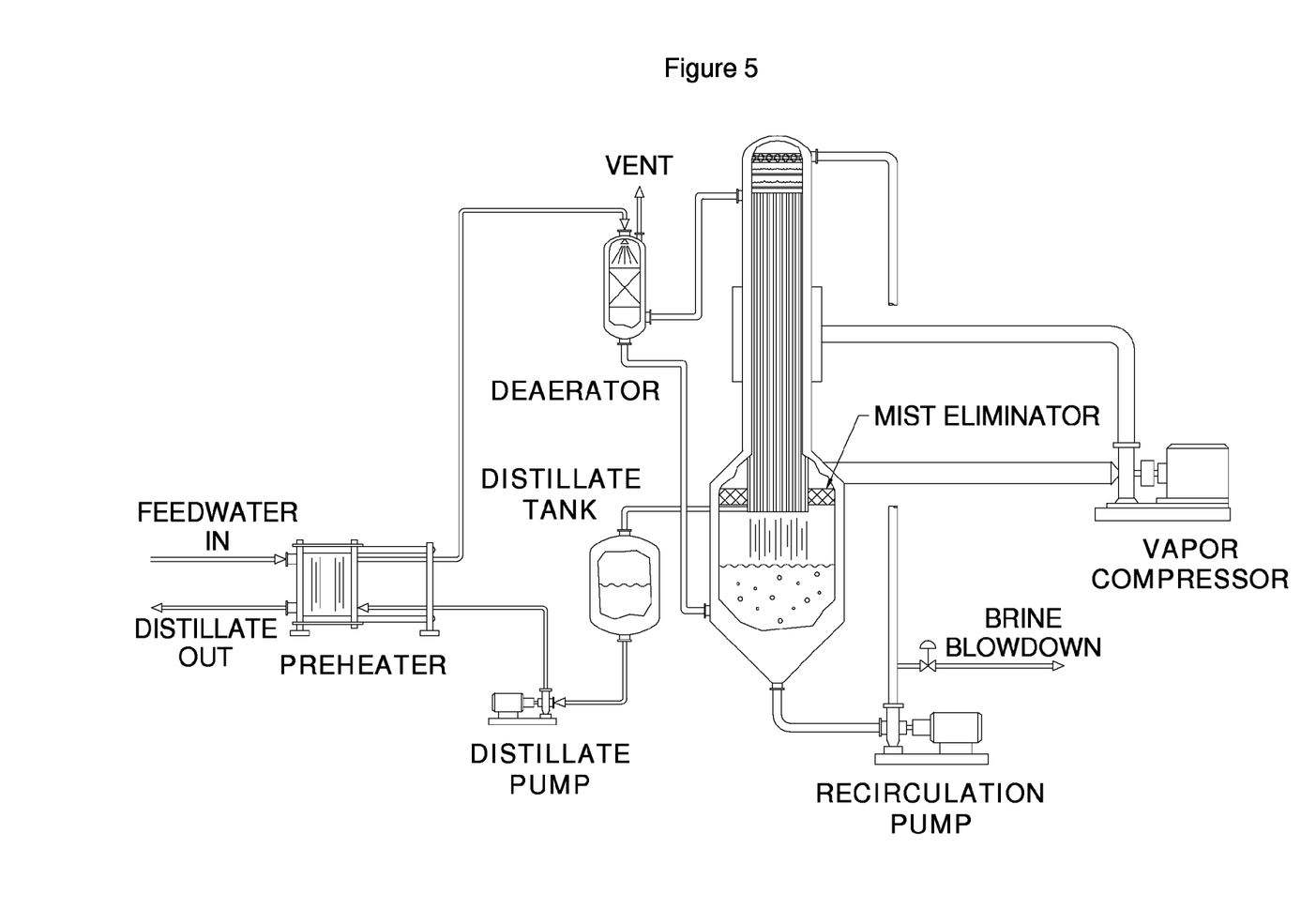
FIG. 5 is a conventional wide-sump, falling film evaporator with internal mist eliminator.

The vertical-tube evaporator used in embodiments of the invention has a straight-sump design (FIGS. 3 & 4) which means that the lower sump has an equivalent diameter to that of the vertical tube-bundle section. This is significant because the high volume of recirculating brine falling from the tubes maintains a turbulent and downward moving flow pattern in the sump that prevent oil and organics from accumulating in the sump. This is a superior concept compared to the wide-sump evaporator (FIG. 5) because the wide-sump has a quiescent volume where oil, grease and other organics typically accumulate requiring an intermittent oil removal system. Accumulation of oil and organics worsen the distillate purity, cause damage to the system, and increase downtime. Computational fluid dynamic analysis shows that there is very little mixing between the high velocity inner-core and low velocity annular volume (example 3).

The water vapor generated in the evaporator tubes flows downward, exits the evaporator and flows into a mist eliminator vessel (FIG. 6) that is external to the evaporator. The mist eliminator vessel makes a significant improvement in distillate purity by removing even very fine brine droplets (diameter less than 5 micrometers) from the vapor stream. The high-efficiency mist eliminator utilizes a multiple-stage design to guarantee the high purity of the distillate. The mist eliminators have at least two stages of mist elimination. Stage one consists of chevrons. Industrial chevrons mist eliminators are an array of thin gauge metal arranged in a zig-zag pattern such that mist droplets will contact the metal surfaces and be removed from the vapor stream. These chevrons may remove more than 95% of the entrained brine droplets. This first stage is referred to as the coarse removal stage and is responsible for capturing the droplets of small, medium and large size. A second stage of chevrons is included to provide finer removal of the remaining entrained brine droplets. Additional stages may be added for removal of increasingly finer droplets.

Figure 6:
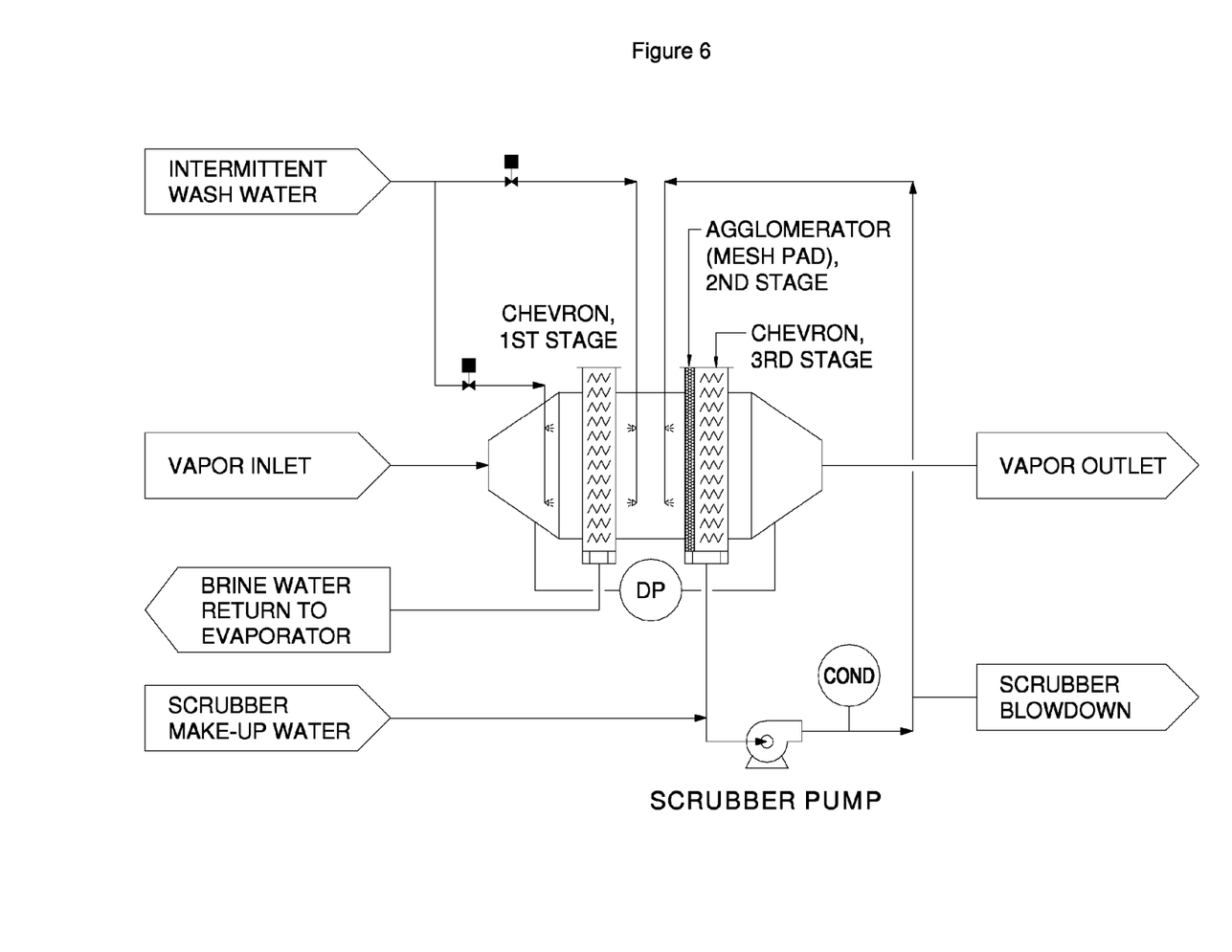
FIG. 6 is a drawing showing the high efficiency mist elimination and vapor cleaning system that produces the high purity distillate.

It is the capture of these very fine droplets that guarantees that the invention will produce distillate of the highest purity. The integrated second and third stages of mist elimination are mesh agglomerator pads and polishing chevrons, respectively. Mesh agglomeration pads are stationary mist elimination elements that consist of very fine diameter wire knitted together to form a pad. The agglomeration pads force the very small droplets to impact and coalesce to form medium and large size droplets. The very small droplets that have now been enlarged into medium and large size droplets are reentrained in the vapor and exit the second stage and enter the third stage. The reentrained droplets are then removed from the vapor by the third stage polishing chevron.

The conventional technology utilizes mist eliminators designed for vertical flow that are installed in the inner annulus of the evaporator itself. This design is susceptible to solids accumulation because the solids-containing brine droplets drain at a low velocity because they are being opposed by the upwards flow of vapor. The hybrid mist eliminator design overcomes this deficiency by utilizing a mist eliminator system that is designed for horizontal flow and that is located externally to the vessel. Horizontal flow design allows for superior brine-droplet removal because the vapor flow (horizontal) does not oppose the drainage path of the captured droplets (vertically downwards). Thus, the horizontal mist eliminator design naturally alleviates solids plugging issues that are experienced by the conventional technology.

Furthermore, the first stage chevron can be provided with a washing system to intermittently cleanse the chevrons of any solids that do accumulate. The washing solution used is typically a high pH scrubbing solution prepared with sodium hydroxide which is designed to target the removal of silicate solids. The first stage chevrons are all washed at a regular frequency to ensure that solids do not accumulate to a high degree. Washing of the chevrons can be performed all-at-once or in a sequence.

The second stage is provided with a scrubbing system that continuously sprays a washing solution into the vapor stream. This absorbs volatile components and further enhances the distillate purity.

Figure 10:
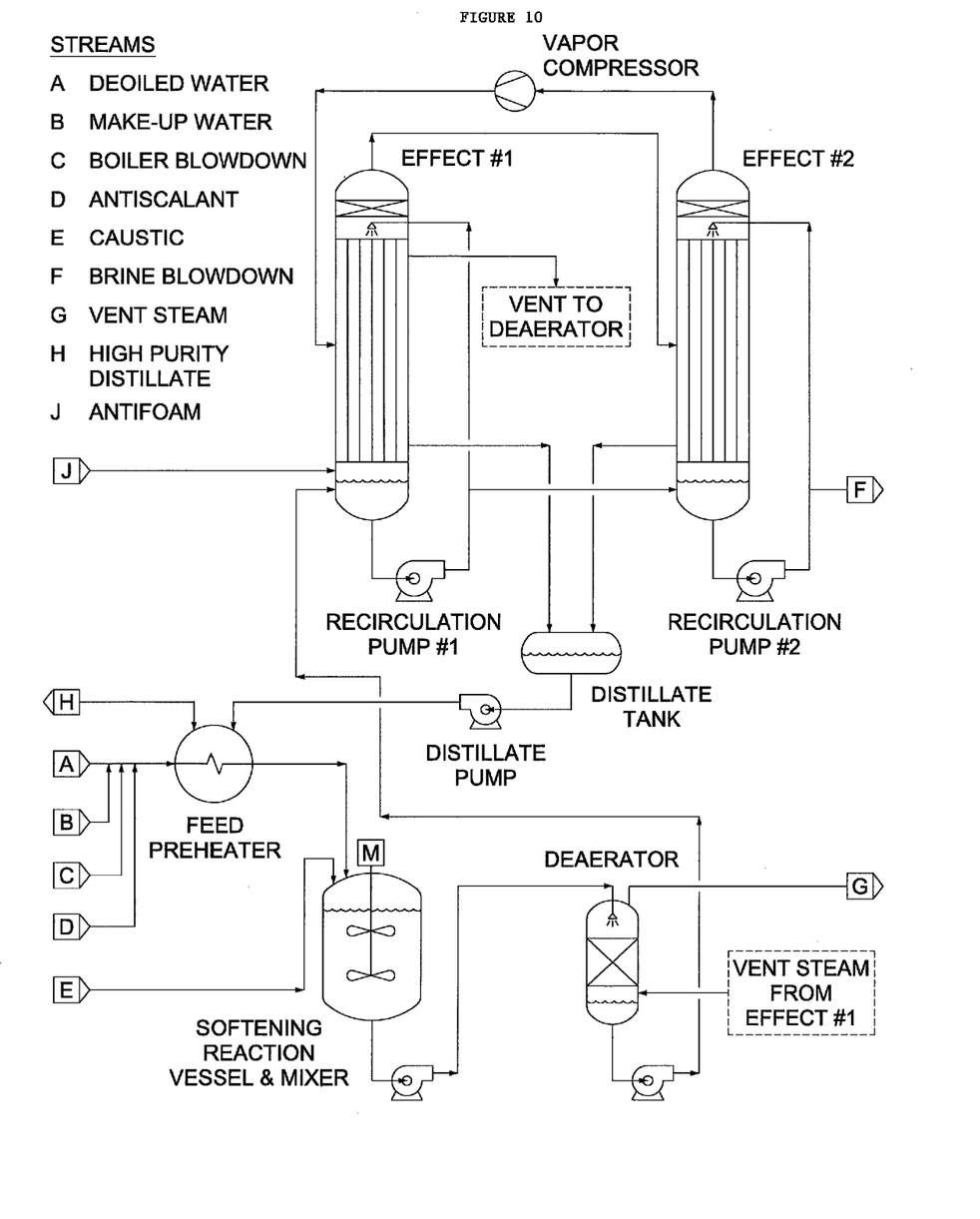
FIG. 10 shows a multiple effect evaporator system.

The distillate purity can also be enhanced by arraying the evaporators in a multiple-effect configuration (FIG. 10) such that the vapor generated from one effect is the steam that drives evaporation in the next evaporator effect. Typically two or more effects are used, though more could be included if desired. This design offers at least two key advantages over the conventional technology. First, there is a significant reduction in power consumption (for MVC design only) because less than half of the total vapor generated must be processed by the vapor compressor. This power reduction significantly reduces the operating cost of the evaporator system. Second, more than half of the vapor produced by the total system is produced from brine at lower total dissolved solids (TDS) concentrations. This is important because the fine droplets entrained in the vapor will have a lower TDS concentration (compared to the final brine concentration) which results in an even higher purity distillate.

Figure 8:
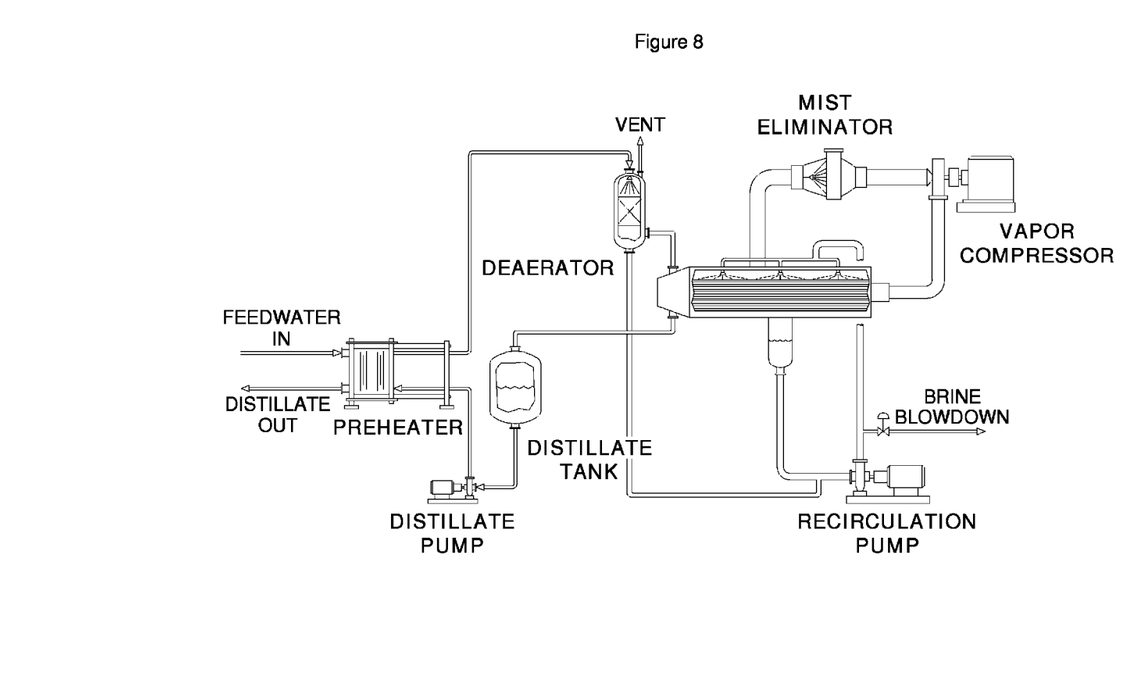
FIG. 8 shows a horizontal tube falling film evaporator.

An alternative to the vertical tube evaporator is a horizontal spray-film evaporator (FIG. 8). The horizontal evaporator operates in much the same manner as the VTFF. However, in a horizontal evaporator the brine is recirculated at a high flow rate and is distributed onto the outside of the tubes by a spray header located above the tube bundle. The brine evenly wets the top row of tubes and successively falls onto lower rows of tubes until eventually being collected in the bottom sump. As the brine falls as a film on the outside of the tube, steam condenses on the inside of the tube and transfers heat to the falling brine film. This brine water is vaporized on the outside of the tube and flows out of the evaporator as water vapor into a mist eliminator vessel as previously described by this specification. The sump of the horizontal tube evaporator is maintained in a turbulent condition due to the recirculating brine in much the manner as for the straight sump design that similarly prevents oil and organics from accumulating in the sump.

The brine that is preconcentrated in the VTFF evaporator(s) is blowndown to the forced-circulation evaporator which completes the concentration and allows the entire system to recycle better than 98% of the total feed water. ZLD is achieved through the application of a drying technology, centrifugal separation technology or filtration to dewater the solids such that they will pass the EPA paint filter test.

EXAMPLES

Example 1 describes performance of an evaporation system treating produced water by generating high quality distillate. A pilot scale test was run on a representative sample of produced water from a SAGD process to ascertain the effectiveness of several design enhancements. The objectives were 1) to prove the effectiveness of softening the produced water upstream of the evaporator and 2) to prove that straight-sump falling film evaporator design could process a high amount of oil and grease. Of course, the satisfaction of these test objectives should not be viewed as a requirement for an embodiment to be within the scope of the claims. The total run time of the pilot testing was 972 hrs. The evaporator system was operated at a concentration factor of 26 for a net recovery of 96%.

The process stages included produced water softening reactor, produced water preheater, deaerator, vertical-tube falling film evaporator (straight-sump), multiple-stage mist elimination, and a final vapor condenser. Evaporation on the pilot scale was driven by a steam generator such that the process models a multiple-effect falling film evaporation system.

The produced water contained 15.0 ppm of oil and grease. This oil and grease level was acceptable for the operation of the evaporator system with the straight sump evaporator. There was no visible evidence of an oil or hydrocarbon phase accumulating in the sump above the water phase. This was due to the continuous turbulence provided by the straight sump design. The oil did not accumulate in the evaporator system and was continuously blowndown with the brine concentrate leaving the evaporator (concentration factor=26).

The produced water was added to a softening reaction vessel prior to the preheating, stage. In the softening reaction vessel, sodium hydroxide was added to the stream at concentrations in the range of 500 ppm to 1,000 ppm. The water was softened as salts of calcium and magnesium precipitated from the solution. An antiscalant chemical was also added to the feedwater in the amount of 16 mg/L. The salts that precipitated were suspended in solution with a mixer and moved through the rest of the system and were eventually blowndown from the evaporator with the concentrated brine. The average solids size produced in the softening reaction step was 5.8 micrometers which is a size suitable for movement through the evaporator without significant accumulation.

Example 2 reports effectiveness of the hybrid mist eliminator. Quantitatively, the effectiveness of the hybrid mist eliminator can be seen by comparing the droplet capture efficiency at various droplet sizes. The droplet capture of the hybrid external mist eliminator is superior to the conventional internal mist eliminator through the entire spectrum but is more pronounced in the capture efficiency of the fine droplets. For droplets with a diameter of 5.0 micrometers, the hybrid mist eliminator captures 6% more droplets than the internal mist eliminator. For droplets with a diameter of 4.0 microns, the hybrid mist eliminator captures 34% more; at 3.0 micrometers, the hybrid mist eliminator captures a staggering 80% more droplets. The improved droplet removal efficiencies is physically observed in this process by producing water with a superior distillate quality because there are substantially fewer brine droplets that remain entrained in the vapor after the mist eliminator.

Figure 9:
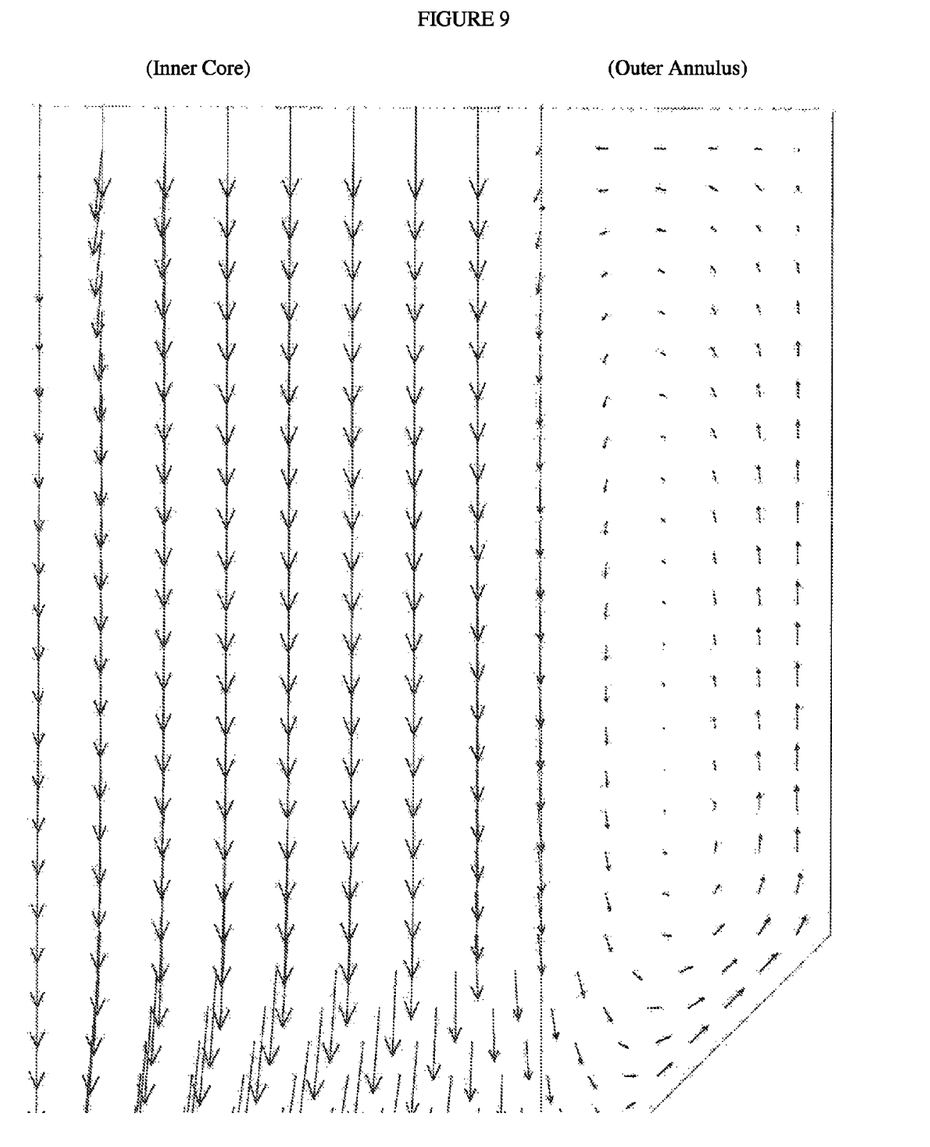
FIG. 9 shows the results of a computational fluid dynamics study of the fluid flow through the evaporator wide sump: showing high downward velocity through the inner-core and large quiescent volume in the outer annulus.

Example 3 reports the deficiency of the wide-sump design in that a quiescent volume is generated that leads to stagnation and accumulation of oil and hydrocarbons. A computation fluid dynamic study (FIG. 9) was undertaken to determine the effectiveness of an evaporator wide-sump to provide good mixing and prevent the creation of stagnant pockets. The results of the study show that the wide-sump does, in fact, create a quiescent volume in the annular region of the sump. The fluid velocities in this annular region range from approximately 0 feet per second to 1 feet per second. In the chamber, the fluid circulates counterclockwise from the bottom to the top. The recirculating velocities within the side chamber are very small and indicate very little mixing and very little new flow of liquid into this section of the tank. In contrast to the wide-sump, the straight-sump evaporator simulates fluid flow in a pipe and has a relatively uniform velocity profile that precludes the creation of stagnant side chambers.

Patents, patent applications, publications, scientific articles, books, web sites, and other documents and materials referenced or mentioned herein are indicative of the levels of skill of those skilled in the art to which the inventions pertain, as of the date each publication was written, and all are incorporated by reference as if fully rewritten herein. Inclusion of a document in this specification is not an admission that the document represents prior invention or is prior art for any purpose.

We claim:

1. A method for production of purified distillate from produced water used in heavy oil production, comprising:
   (a) providing produced water stream extracted from a heavy oil production well;
   (b) deoiling said produced water stream to provide a deoiled water stream;
   (c) increasing the pH of said deoiled water stream to provide a softened water stream by precipitating calcium and magnesium from the deoiled water stream;
   (d) preheating said softened water stream in a heat exchanger;
   (e) deaerating said softened water stream;
   (f) preconcentrating said softened water stream in a first evaporation stage in an evaporator vessel including a recirculating brine by generating a water vapor stream and a concentrated brine stream;
   (g) demisting said water vapor stream in a mist eliminator external to the evaporator vessel to reduce solids content prior to condensation thereby creating the high purity distillate stream, wherein the demisting step comprises the stages of treating a brine-containing water vapor in at least one coarse removal chevron, treating said brine-containing water vapor with at least one mesh agglomerator pad, and treating said brine-containing water vapor in at least one polishing chevron;
   (h) sending the high purity distillate to a high pressure boiler or steam generator for the production of steam and subsequent injection to a reservoir via an injection well.

2. The method of claim 1, further supplementing the produced water stream of step (a) by addition of at least one member of the group consisting of boiler blowdown water, makeup water, and wastewater to the produced water stream.

3. The method of claim 2, wherein the produced water stream is supplemented with makeup water, and prior to supplementing said produced water, softening said makeup water with a member of the group consisting of a membrane system and an ion exchange system.

4. The method of claim 2, wherein the produced water stream is supplemented with makeup water, further comprising heating said makeup water independently of the other evaporator feedwater streams prior to entry of said makeup water into the evaporator vessel.

5. The method of claim 4, wherein the produced water stream is supplemented with makeup water, further comprising the step of, prior to addition of said makeup water to said produced water stream, lowering the pH of said makeup water by adding acid to said makeup water, thereby producing free carbon dioxide for removal from said makeup water.

6. The method of claim 1, wherein said first evaporation stage is a vertical falling-film evaporator having a top and a bottom.

7. The method of claim 6, wherein said vertical falling-film evaporator is a straight-sump vertical falling-film evaporator.

8. The method of claim 7, wherein the concentration of oil in said deoiled water stream is less than about one hundred parts per million.

9. The method of claim 6, where the recirculating brine recirculating at the top of the vertical falling-film evaporator is cascaded through a plurality of horizontal distribution trays prior to being distributed on the upper tubesheet and subsequently evenly distributed in the evaporator tubes.

10. The method of claim 1, wherein said first evaporation stage is a horizontal spray-film evaporator.

11. The method of claim 1, wherein said first evaporation stage is a multiple-effect evaporator.

12. The method of claim 1, further comprising treating said concentrated brine stream in a second evaporation stage, wherein said second evaporation stage is a forced-circulation evaporator.

13. The method of claim 1, wherein said pH is increased to between 9.5 and 13.0 as measured at 25° C.

14. The method of claim 1, wherein the pH is increased by addition of sodium hydroxide.

15. The method of claim 1, comprising further concentrating said softened water stream in a second evaporation stage which produces another purified distillate stream and produces a dry solids product to achieve zero-liquid discharge.

16. The method of claim 1, comprising further concentrating a brine blowdown from said first evaporation stage, thereby producing another purified distillate stream and a reduced volume of concentrated brine wastewater for disposal.

17. The method of claim 1, comprising further concentrating a brine blowdown from the first evaporation stage, thereby producing another purified distillate stream and a reduced volume of concentrated brine wastewater to minimize the size of a downstream zero liquid discharge crystallizer.

18. The method of claim 1, wherein said preheating step is conducted upstream of said softening step.

19. A method for producing boiler water from produced water used in heavy oil production, comprising:
   producing purified distillate according to the method of claim 1;
   managing the enthalpy of said purified distillate using a preheater bypass, producing boiler water for said boiler from said purified distillate, wherein said enthalpy management maximizes enthalpy of water delivered to said boiler.

20. The method of claim 19, wherein said deaerating said softened water stream produces a steam vent with a low flow rate because the excess enthalpy is released from the system in the distillate stream in lieu of being released as additional steam vent, thereby reducing the operating requirements of at least one of the catalytic oxidizer and flare stack.

* * * * *